(12) United States Patent
Yamada et al.

(10) Patent No.: US 7,506,933 B2
(45) Date of Patent: Mar. 24, 2009

(54) SEAT RECLINING DEVICE

(75) Inventors: Yukifumi Yamada, Toyota (JP); Hideo Nihonmatsu, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 130 days.

(21) Appl. No.: 11/508,309

(22) Filed: Aug. 23, 2006

(65) Prior Publication Data

US 2007/0046090 A1 Mar. 1, 2007

(30) Foreign Application Priority Data

Aug. 24, 2005 (JP) ............................. 2005-242525

(51) Int. Cl.
*B60N 2/02* (2006.01)
(52) U.S. Cl. ...................... 297/364; 297/369
(58) Field of Classification Search ................. 297/364, 297/369
See application file for complete search history.

(56) References Cited

U.S. PATENT DOCUMENTS

| | | | | |
|---|---|---|---|---|
| 3,958,828 | A * | 5/1976 | Ishida et al. ............. 297/361.1 |
| 4,502,730 | A * | 3/1985 | Kazaoka et al. ............ 297/366 |
| 4,709,965 | A * | 12/1987 | Kazaoka et al. ............ 297/366 |
| 5,547,254 | A * | 8/1996 | Hoshihara .................. 297/367 |
| 5,622,408 | A * | 4/1997 | Yamada et al. ............. 297/367 |
| 7,204,555 | B2 * | 4/2007 | Thiel ......................... 297/367 |
| 2002/0000746 | A1 | 1/2002 | Matsuura et al. |

FOREIGN PATENT DOCUMENTS

| | | |
|---|---|---|
| EP | 1 172 250 A2 | 1/2002 |
| JP | 2000-270946 A | 10/2000 |
| JP | 2001-292850 | 10/2001 |

OTHER PUBLICATIONS

European Search Report.

\* cited by examiner

*Primary Examiner*—Sarah B McPartlin
(74) *Attorney, Agent, or Firm*—Buchanan Ingersoll & Rooney PC (57) ABSTRACT

A seat reclining device includes a spiral spring made of a wire and formed in a spiral shape having a first engaged portion and a second engaged portion, a first engaging member engaging the first engaged portion, and a second engaging member engaging the second engaged portion, wherein one/each of the first engaging member and the second engaging member includes an extending direction supporting member supporting the first engaged portion and/or the second engaged portion, from the opposite end side of the wire in an extending direction thereof, a first supporting member supporting the first engaged portion and/or the second engaged portion from outside of the wire, and a second supporting member supporting the first engaged portion and/or the second engaged portion from inside of the wire in a normal direction thereof.

7 Claims, 8 Drawing Sheets

SEAT RECLINING DEVICE

CROSS REFERENCE TO RELATED APPLICATIONS

This application is based on and claims priority under 35 U.S.C. § 119 to Japanese Patent Application 2005-242525, filed on Aug. 24, 2005, the entire content of which is incorporated herein by reference.

FIELD OF THE INVENTION

The present invention relates to a seat reclining device having a spiral spring applying a predetermined biasing force to a seat back so that a seat back rotates relative to a seat cushion in a predetermined rotational direction.

BACKGROUND

Figure 8:
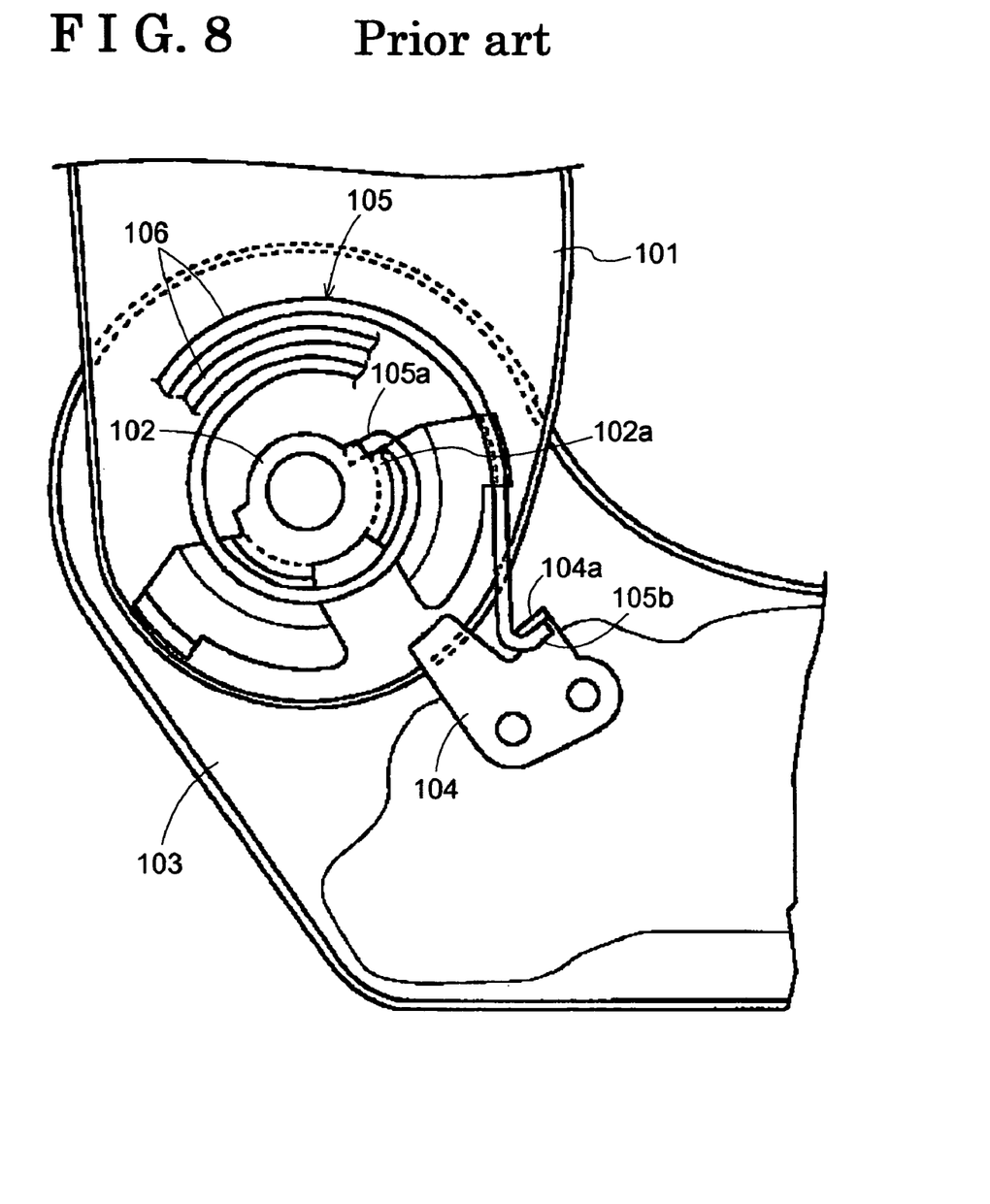
FIG. 8 illustrates a front view indicating a seat reclining device related to an prior art related to the present invention.

Related to a mounting structure of the spiral spring of the seat reclining device, a reclining device is disclosed in, for example, JP2001-292850A, which includes a first hook plate 102 fixed at seat back frame 101, a second hook plate 104 fixed at a seat cushion frame 103, and a spiral spring 105 for applying a biasing force to the seat back frame 101 to rotate forward. The spiral spring 105 includes an inner end portion 105a formed by bending an end of the spiral spring 105 inward in a radial direction of the spiral spring 105 and an outer end portion 105b formed by bending an end of the spiral spring 105 outward in a radial direction of the spiral spring 105, and the spiral spring 105 applies the biasing force in a manner where the inner end portion 105a engages the first hook plate 102, and an outer end portion 105b engages the second hook plate 104.

The first hook plate 102 includes a first spring hook 102a formed so as to protrude in a direction that parallels to a rotation shaft of the seat back frame 101, and the first spring hook 102a engages the inner end portion 105a of the spiral spring 105 in a manner where the inner end portion 105a is hooked-on an end portion of the first spring hook 102a.

The second hook plate 104 includes a second spring hook 104a formed so as to protrude in a direction that parallels to a rotation shaft of the seat back frame 101, and the second spring hook 104a engages the outer end portion 105b of the spiral spring 105 in a manner where the outer end portion 105b is hooked on an end portion of the second spring hook 104a.

In this configuration, because the rotations of the inner end portion 105a and the outer end portion 105b relative to the first spring hook 102a or the second spring hook 104a are not limited, a portion near the outer end portion 105b of the spiral spring 105 which is comprised of a wire 106 moves inward in a normal direction thereof because of a spring force of the wire 106 to extend to be straight, and a portion near the inner end portion 105a of the wire 106 moves outward in a normal direction thereof.

Thus, when the wire 106 is unevenly provided, an internal stress applied to each part of the wire 106 becomes uneven. In other words, at a portion of the wire 106, where its curvature is relatively large, a level of an internal stress becomes high, and at other portions of the wire 105, where its curvature is small, a level of an internal stress becomes low.

In this configuration, the spiral spring 105 needs to be designed in a manner where a working stress thereof is set on the basis of the highest internal stress. To provide the spiral spring 105 having such structure, the spiral spring 105 having a high working stress has been used, however, a cost of such spiral spring 105 is relatively high, and a diametral dimension of the spiral spring 105 becomes relatively large.

A need thus exists to provide a seat reclining device by which chances that the position of the wire configuring the spiral spring is unevenly provided are reduced, and an internal stress applied to each part of the wire configuring the spiral spring can be equalized.

SUMMARY OF THE INVENTION

According to an aspect of the present invention, a seat reclining device includes a spiral spring made of a wire and formed in a spiral shape including a first engaged portion formed at one end of the spiral spring and a second engaged portion formed at the other end of the spiral spring, wherein one of the first engaged portion and the second engaged portion engaging a seat cushion frame, and the other of the first engaged portion and the second engaged portion engaging a seat back frame, which is rotatably provided at the seat cushion frame, a first engaging member engaging the first engaged portion of the spiral spring, and a second engaging member engaging the second engaged portion of the spiral spring, wherein one of the first engaging member and the second engaging member, or each of the first engaging member and the second engaging member including an extending direction supporting member supporting the first engaged portion and/or the second engaged portion, from the opposite end side of the wire in an extending direction thereof, a first supporting member supporting the first engaged portion and/or the second engaged portion from outside of the wire in a normal direction thereof, and a second supporting member supporting the first engaged portion and/or the second engaged portion from inside of the wire in a normal direction thereof, the second supporting member provided so as to be distanced at a predetermined distance from the first supporting member toward the opposite end side of the wire in an extending direction thereof.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 1:
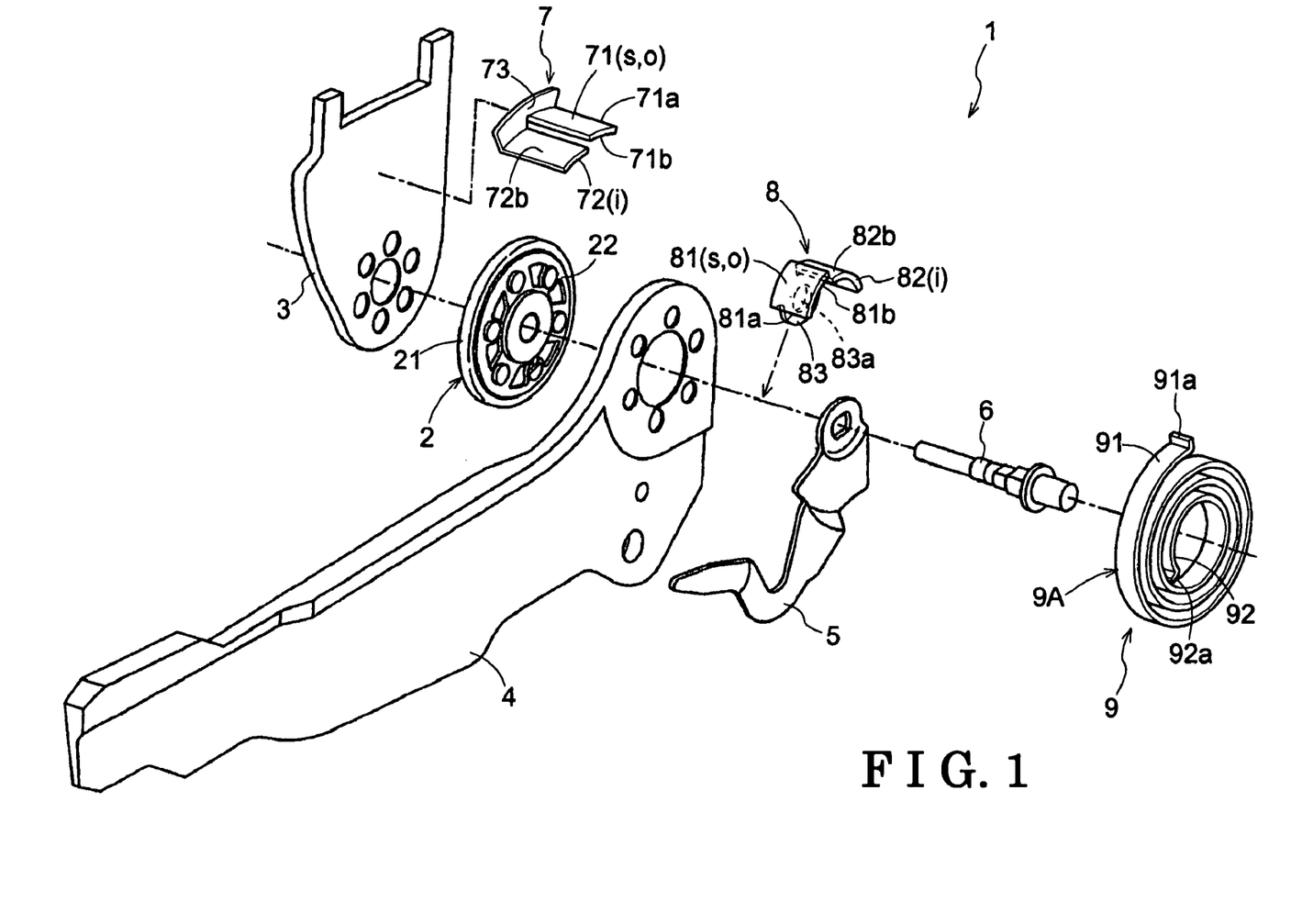
FIG. 1 illustrates an exploded perspective view indicating a seat reclining device related to a first embodiment.
Figure 2:
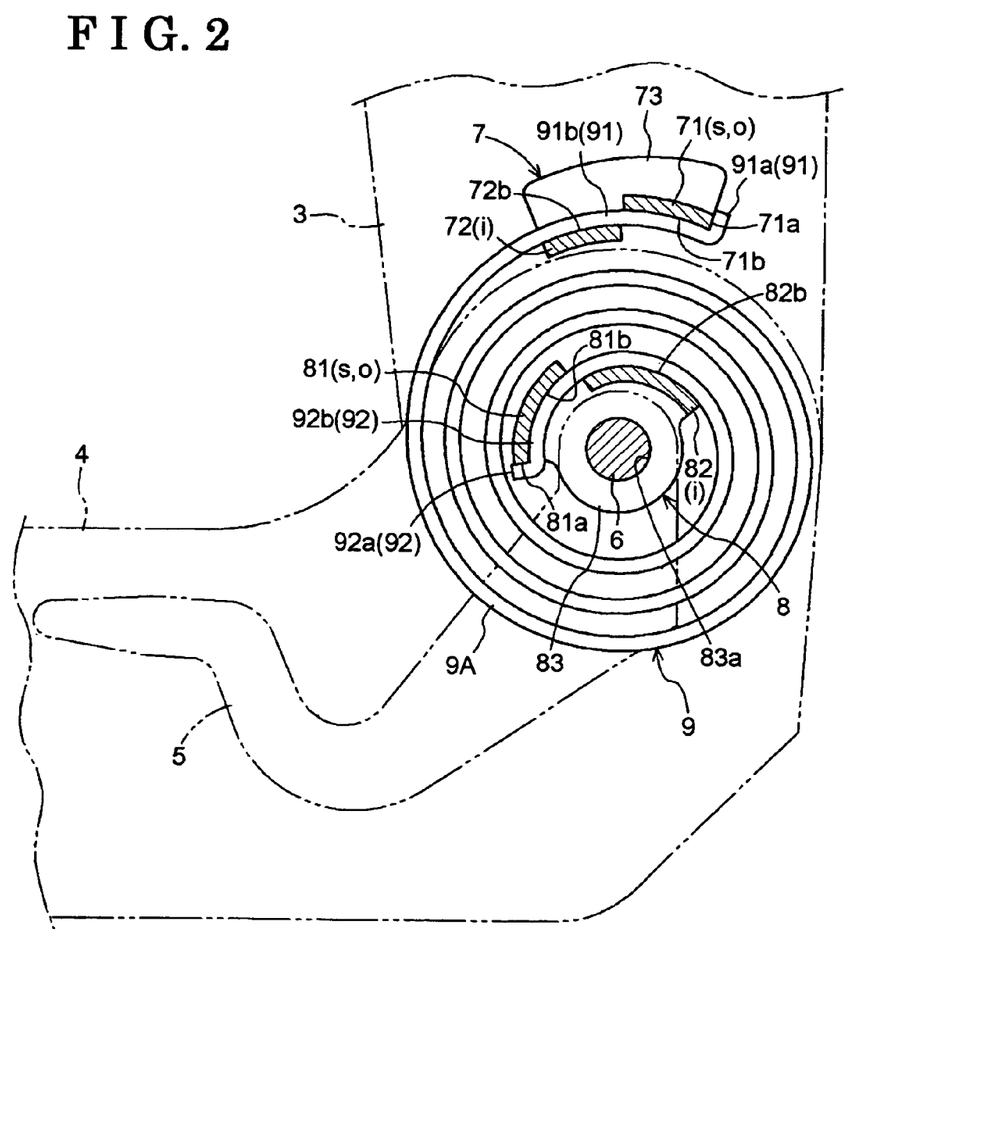
FIG. 2 illustrates a front view indicating the seat reclining device related to the first embodiment.
Figure 3:
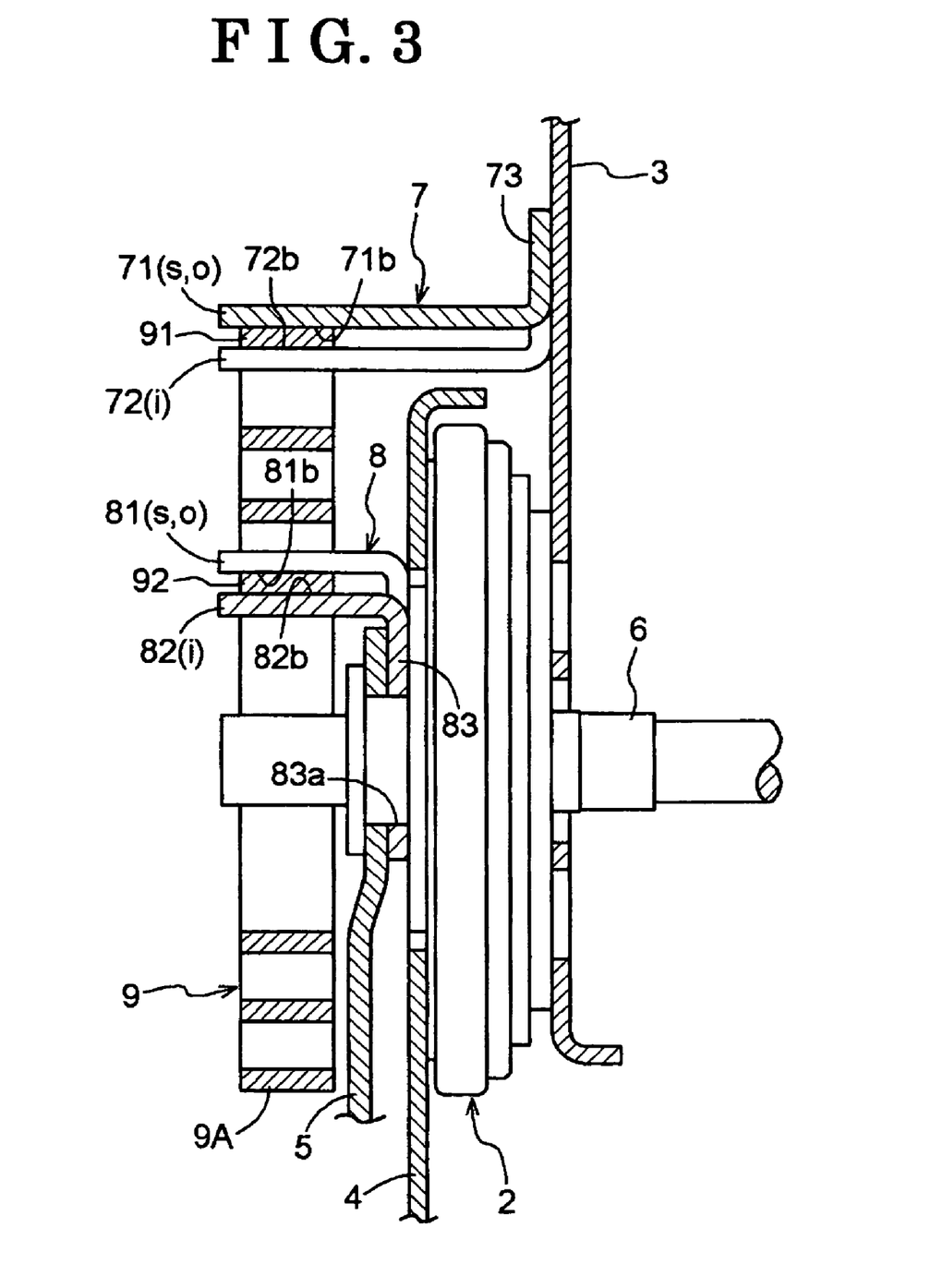
FIG. 3 illustrates a cross section indicating the seat reclining device related to the first embodiment.

A first embodiment related to the present invention will be explained in accordance with the attached drawings. In this embodiment, an example of a seat reclining device 1 attached to a vehicle seat will be described. FIG. 1 illustrates an exploded perspective view indicating the seat reclining device 1 related to the embodiment. FIG. 2 illustrates a front view indicating the seat reclining device 1 related to the embodiment. FIG. 3 illustrates a cross section indicating the seat reclining device 1 related to the embodiment.

As shown in FIGS. 1 through 3, the seat reclining device 1 includes a seat back frame 3, a seat cushion frame 4, a lock device 2, an operation lever 5 and a lever shaft 6. Specifically, the seat back frame 3 configures a bone structure of the seat back, the seat cushion frame 4 configures a bone structure of the seat cushion, the lock device 2 is provided at a connecting portion between the seat back frame 3 and the seat cushion frame 4, and the operation lever 5 and the lever shaft 6 serve as a operating portion of the lock device 2.

The seat reclining device 1 further includes a spiral spring 9 for applying a biasing force to the seat back frame 3 in a front direction of the vehicle seat (in an approximately left direction in FIG. 1). More specifically, an outer end engaging member 7 is attached to the seat back frame 3, and an inner end engaging member 8 is attached to the seat cushion frame 4.

The outer end engaging member 7 engages the outer end engaged portion 91 (first engaged portion) of the spiral spring 9, and the inner end engaging member 8 engages the inner end engaged portion 92 of the spiral spring 9. In this configuration, the outer end engaged portion 91 of the spiral spring 9 is engaged with the seat back frame 3, and the inner end engaged portion 92 of the spiral spring 9 is engaged with the seat cushion frame 4.

The lock device 2 includes a first member 21, a second member 22, and a lock mechanism (not shown). The first member 21 is fixed to the seat back frame 3; the second member 22 is fixed to the seat cushion frame 4. The first member 21 and the second member 22 are engaged together so as to relative rotate each other and so as not to be separated. The lock mechanism controls a relative rotation between the first member 21 and the second member 22 so as to be locked or unlocked.

The seat back frame 3 is fixed to the seat cushion frame 4 by means of the lock device 2 so as to be rotatable relative to the seat cushion frame 4. When the lock mechanism of the lock device 2 is in a locked state, the rotation of the seat back frame 3 relative to the seat cushion frame 4 is fixed at a certain angle. On the other hand, when the operation lever 5 is operated, and the lock mechanism of the lock device 2 becomes in an unlocked state, the rotation of the seat back frame 3 relative to the seat cushion frame 4 is allowed.

The seat reclining device described above is attached to one side of the vehicle seat, for example a right side in a vehicle width direction of the vehicle seat. Another seat reclining device having the same configuration will be attached to the other side of the vehicle seat, for example a left side in a vehicle width direction of the vehicle seat. In this case, the seat reclining device attached to the left side of the vehicle seat does not include an operation lever 5, and a lever shaft 6 of the left seat reclining device is connected to the lever shaft 6 of the right seat reclining device so that the left seat reclining device is rotated by operating the operation lever 5 of the right seat reclining device. Thus, the right seat reclining device interlocks with the left seat reclining device.

2. A Configuration of the Spiral Spring 9.

As shown in FIGS. 1 through 3, the spiral spring 9 is made of a wire 9A having a constant rectangular shaped cross section and being rolled in a spiral shape. The outer end engaged portion 91 is formed in the vicinity of an outer end portion (end portion at an outer end in a radial direction) of the wire 9A of the spiral spring 9, and the inner end engaged portion 92 is formed in the vicinity of an outer end portion (end portion at an inner end in a radial direction) of the wire 9A of the spiral spring 9.

Specifically, in this embodiment, an area at which the outer end engaging member 7 is indicated as the outer end engaged portion 91, and an area, at which the inner end engaging member 8 engages, is indicated as the inner end engaged portion 92.

The outer end engaged portion 91 includes a bending portion 91a, which is formed in such a way that the outer end portion of the wire 9A is bent outward in a normal direction thereof at approximately 90 degrees. The inner end engaged portion 92 includes a bending portion 92a, which is formed in such a way that the inner end portion of the wire 9A is bent outward in a normal direction thereof at approximately 90 degrees.

Thus, the spiral spring 9, other than the bending portions 91a and 92a, are formed in a predetermined spiral shape. An arc portion formed along the spiral shape within the outer end engaged portion 91 other than the bending portion 91a is indicated as a main portion 91b, and an arc portion formed along the spiral shape within the inner end engaged portion 92 other than the bending portion 92a is indicated as a main portion 92b.

3. A Configuration of the Outer End Engaging Member 7.

The outer end engaging member 7 is fixed to the seat back frame 3 and engages the outer engaged portion 91 of the spiral spring 9. The outer end engaging member 7 includes an outer supporting plate 71, an inner supporting plate 72, and a main portion 73. Specifically, the outer supporting plate 71 supports the outer end engaged portion 91 from outside of the wire 9A in a normal direction thereof, the inner supporting plate 72 supports the outer end engaged portion 91 from inside of the wire 9A in a normal direction. The main portion 73 supports the outer supporting plate 71 and the inner supporting plate 72 so as to be integral.

As shown in a front diagram illustrated in FIG. 2, the outer supporting plate 71 has a cross section that is curved so as to correspond to the main portion 91b of the outer end engaged portion 91 of the spiral spring 9 in the front view illustrated in FIG. 2, and provided so as to be approximately orthogonal relative to the main portion 73. The outer supporting plate 71 includes an extending direction contacting surface 71a and an outer contacting surface 71b. Specifically, the outer supporting plate 71 supports the bending portion 91a in a manner where the extending direction contacting surface 71a contacts the bending portion 91a from the side of the inner end of the wire 9A in an extending direction thereof (from the opposite end side in an extending direction), and the outer contacting surface 71b contacts the main portion 91b of the outer end engaged portion 91 from outside of the wire 9A in a normal direction thereof.

In this embodiment, an end surface formed at the outer supporting plate 71 so as to face the outer end of the wire 9A in a extending direction thereof corresponds to the extending direction contacting surface 71a, in other words, a right end surface of the outer supporting plate 71 in the front view illustrated in FIG. 2 corresponds to the extending direction contacting surface 71*a*. A bottom surface of the outer supporting plate 71 in the front view illustrated in FIG. 2 corresponds to the outer contacting surface 71*b*.

Thus, the outer supporting plate 71 supports the outer end engaged portion 91 at the extending direction contacting surface 71*a* from the side of the inner end of the wire 9A in an extending direction thereof, and the outer supporting plate 71 supports the outer end engaged portion 91 at the outer contacting surface 71*b* from outside of the wire 9A in a normal direction thereof.

In this specification, "the side of the inner end of the wire 9A in an extending direction thereof" means the side of the inner end portion (the side of the bending portion 92*a* of the inner end engaged portion 92) along the extending direction of the wire 9A. On the other hand, "the side of the outer end of the wire 9A in an extending direction thereof" means the side of the outer end portion (the side of the bending portion 91*a* of the outer end engaged portion 91) along the extending direction of the wire 9A.

In the same manner as the outer supporting plate 71, as shown the front view illustrated in FIG. 2, the inner supporting plate 72 has a cross section that is curved so as to correspond to the main portion 91*b* of the outer end engaged portion 91 of the spiral spring 9, and provided so as to be approximately orthogonal relative to the main portion 73. The inner supporting plate 72 is provided at the side of the wire 9A in an extending direction thereof relative to the outer supporting plate 71 and at the inside of the wire 9A in a normal direction.

The inner supporting plate 72 includes an inner contacting surface 72*b* contacting the main portion 91*b* of the outer end engaged portion 91 from inside of the wire 9A in a normal direction thereof. An upper surface of the inner supporting plate 72 in FIG. 2 corresponds to the inner contacting surface 72*b*. Thus, the inner contacting surface 72*b* contacts the outer end engaged portion 91 from inside of the wire 9A in a normal direction thereof.

The inner supporting plate 72 is provided in order to support the outer end engaged portion 91 in such a manner where it is distanced at a predetermined distance from a position at which the outer supporting plate 71 supports the outer end engaged portion 91, toward the side of the inner end of the wire 9A in an extending direction thereof. As shown in FIG. 2, a positional relationship between the inner supporting plate 72 and the outer supporting plate 71 in an extending direction of the wire 9A will be explained as follows. A position of an end portion of the inner contacting surface 72*b* at the outer end side in an extending direction thereof (a right end in FIG. 2) is located so as to be approximately identical with a position of an end portion of the outer contacting surface 71*b* at the inner end side of the wire 9A in an extending direction thereof (a left end in FIG. 2).

The outer contacting surface 71*b* and the inner contacting surface 72*b* support the outer end engaged portion 91 so as to contact at contacting surfaces. The outer contacting surface 71*b* and the inner contacting surface 72*b* support the outer end engaged portion 91 so as to contact at least at plural points. Thus, the outer end engaged portion 91 is not supported by only the end portion of the outer contacting surface 71*b* at the side of the inner end of the wire 9A in an extending direction thereof and the end portion of the inner contacting surface 72*b* at the side of the outer end of the wire 9A in an extending direction thereof.

Thus, a position at which the inner supporting plate 72 supports the outer end engaged portion 91 is practically distanced at a predetermined distance toward the side of the inner end of the wire 9A in an extending direction thereof from a position at which the outer supporting plate 71 supports the outer end engaged portion 91.

A part of the outer contacting surface 71*b* may face a part of the inner contacting surface 72*b* in a normal direction of the wire 9A. Further, all area of the outer contacting surface 71*b* may face all area of the inner contacting surface 72*b* in a normal direction of the wire 9A. These alternative configurations are not indicated in the drawings. This configuration is possible, in accordance with a relationship among a shape of the wire 9A, a shape of the outer contacting surface 71*b* and a shape of the inner contacting surface 72*b*, if the position at which the outer supporting plate 71 supports the outer end engaged portion 91 is distanced at a predetermined distance from the position at which the inner supporting plate 72 supports the outer end engaged portion 91.

The wire 9A does not function as a spring at a part of the outer end engaged portion 91 within which the outer supporting plate 71 and the inner supporting plate 72 are engaged in order to support the outer end engaged portion 91. The position of the outer contacting surface 71*b* of the outer supporting plate 71 and the position of the inner contacting surface 72*b* of the inner supporting plate 72 are set in a manner where the length of the outer end engaged portion 91 is determined to be shortest that at least required for supporting the spiral spring 9 so as to be in a predetermined design spiral shape.

The outer supporting plate 71 and the inner supporting plate 72 are positioned in a manner where the point at which the outer contacting surface 71*b* supports the outer end engaged portion of the wire 9A and the point at which the inner contacting surface 72*b* contacts the outer end engaged portion 91 of the wire 9A are fit along the predetermined design spiral shape.

As shown in FIG. 2, related to a positional relationship between the inner supporting plate 72 and the outer supporting plate 71 in a normal direction of the wire 9A, the inner supporting plate 72 and the outer supporting plate 71 are positioned in a manner where the inner contacting surface 72*b*, which is formed in a curved shape, is distanced at a distance, which is approximately identical to the thickness of the wire 9A, in a normal direction of the wire 9A, from the outer contacting surface 71*b*, which is formed in a curved shape. Thus, a plate at which the outer contacting surface 71*b* is located and a plate at which the inner contacting surface 72*b* is located are approximately parallel distanced at a distance, which is approximately identical to the thickness of the wire 9A.

The outer supporting plate 71 and the inner supporting plate 72 are positioned, in a radial direction of the spiral spring 9, in a manner where, in the front view illustrated in FIG. 2, the curved shape of the outer contacting surface 71*b* and the curved shape of the inner contacting surface 72*b* fit along the predetermined design spiral shape of the spiral spring 9.

In other words, the outer contacting surface 71*b* and the inner contacting surface 72*b* are located in order to regulate the outer end engaged potion 91 from outside and inside, in a manner where the shape of the wire 9A becomes identical to the predetermined design spiral shape of the spiral spring 9. The outer contacting surface 71*b* supports the outer end engaged portion 91 so as to contact each other at a contacting surface, and the inner contacting surface 72*b* supports the outer end engaged portion 91 so as to contact each other at a contacting surface. The outer contacting surface 71*b* supports the engaged portion 91 so as to contact each other at least at plural points, and the inner contacting surface 72b supports the outer end engaged portion 91 so as to contact each other at least at plural points.

Thus, the outer supporting plate 71 and the inner supporting plate 72 support the outer end engaged portion 91 of the wire 9A in a manner where the spiral spring 9 becomes in the predetermined design spiral shape.

In a predetermined design spiral shape of the spiral spring 9, a distance between each roll of the wire 9A is approximately constant. In this configuration, when the seat back frame 3 rotates relative to the seat cushion frame 4, each roll of the wire 9A, which is located so as to abut each other, do not interfere with each other.

In this embodiment, related to the outer end engaging member 7 engaging the outer end engaged portion 91 of the spiral spring 9, the outer supporting plate 71 corresponds to the first supporting body of the present invention, the inner supporting plate 72 corresponds to the second supporting body of the present invention, the extending direction contacting surface 71a of the outer supporting plate corresponds to the extending direction contacting portion of the present invention, the outer contacting surface 71b corresponds to the first contacting portion of the present invention, the inner contacting surface 72b of the inner supporting plate 72 corresponds to the second contacting portion of the present invention, the outer supporting plate 71 comprises the extending direction supporting member "s" and the first supporting member "o" of the present invention, and the inner supporting plate 72 comprises the second supporting member "i" of the present invention.

4. Configuration of the Inner End Engaging Member 8.

The inner end engaging member 8 fixed at the seat cushion frame 4 and engages the inner end engaged portion 92 of the spiral spring 9. In this embodiment, the inner end engaging member 8 includes an outer supporting plate 81, an inner supporting plate 82 and a main portion 83. Specifically, the outer supporting plate 81 supports the inner end engaged portion 92 from outside of the wire 9A in a normal direction thereof, the inner supporting plate 82 supports the inner end engaged portion 92 from inside of the wire 9A in a normal direction thereof, and the main portion 83 support the outer supporting plate 81 and the inner supporting plate 82 so as to be integral. Further, a hole 83a is formed in the vicinity of the central portion of the main portion 83, and the lever shaft 6 is inserted into the hole 83a.

As shown in the front view illustrated in FIG. 2, the outer supporting plate 81 has a cross section that is curved so as to correspond to the main portion 92b of the inner end engaged portion 92 of the spiral spring 9, and is provided so as to be approximately orthogonal relative to the main portion 83. The outer supporting plate 81 includes an extending direction contacting surface 81a and an outer contacting surface 81b. Specifically, the outer supporting plate 81 supports the bending portion 92a of the inner end engaged portion 92 in a manner where the extending direction contacting surface 81a contacts from the side of the outer end of the wire 9A in an extending direction thereof (the other end side in an extending direction), and the outer contacting surface 81b contacts the main portion 92b of the inner end engaged portion 92 from outside of the wire 9A in a normal direction thereof.

In this embodiment, an end surface formed at the outer supporting plate 81 provided at the side of the inner end of the wire 9A in an extending direction thereof corresponds to the extending direction contacting surface 81a, in other words, a lower end surface of the outer supporting plate 81 in FIG. 2 corresponds to the extending direction contacting surface 81a. A lower right surface of the outer supporting plate 81 in FIG. 2 corresponds the outer contacting surface 81b.

The outer supporting plate 81 supports the inner end engaged portion 92 at the extending direction contacting surface 81a from the side of the outer end of the wire 9A in an extending direction thereof, and the outer supporting plate 81 supports the inner end engaged portion 92 at the outer contacting surface 81b from outside of the wire 9A in a normal direction thereof.

As shown in a front diagram illustrated in FIG. 2, in the same manner as the outer supporting plate 81, the inner supporting plate 82 has a cross section that is curved so as to correspond to the inner end engaged portion 92 of the spiral spring 9, and is provided so as to. be approximately orthogonal relative to the main portion 83.

The inner supporting plate 82 is located at the side of the outer end of the wire 9A in an extending direction thereof relative to the outer supporting plate 81, and inside in a normal direction of the wire 9A. The inner supporting plate 82 includes an inner contacting surface 82b contacts the main portion 92b of the inner end engaged portion 92 from inside of the wire 9A in a normal direction thereof.

In this embodiment, an upper surface of the inner supporting plate 82 in FIG. 2 is indicated as the inner contacting surface 82b. Thus, the inner contacting surface 82b supports the inner end engaged portion 92 from inside of the wire 9A in a normal direction thereof.

Further, the inner supporting plate 82 is located in a manner where a point at which the inner supporting plate 82 supports the inner end engaged portion 92 is distanced at a predetermined distance toward the side of the other end of the wire 9A from a point at which the outer supporting plate 81 supports the inner end engaged portion 92. As shown in FIG. 2, related to a positional relationship between the inner supporting plate 82 and the outer supporting plate 81, an end of the inner contacting surface 82b formed at the side of the inner end of the wire 9A in an extending direction thereof (the left end in FIG. 2) is distanced at a predetermined distance from an end of the outer contacting surface 81b formed at the side of the outer end of the wire 9A in an extending direction thereof (the right end in FIG. 2). Thus, a space is formed between the outer contacting surface 81b and the inner contacting surface 82b in an extending direction of the wire 9A.

In this configuration, the inner end engaging member 8 is mounted to the wire 9A as follows. First, the inner end engaged portion 92 is inserted into the space between the outer contacting surface 81b and the inner contacting surface 82b in a manner where the wire 9A is rotated so as to be inserted into the space therebetween, then the wire 9A is rotated in a clockwise direction in FIG. 2 so as to contact the outer contacting surface 81b and the inner contacting surface 82b of the inner end engaging member 8 at the inner end engaged portion 92. Thus, because of the space provided between the outer contacting surface 81b and the inner contacting surface 82b, the inner end engaging member 8 engages the inner end engaged portion 92 in a simple way.

In the same manner as the outer end engaging member 7, a part of the outer contacting surface 81b may face a part of the inner contacting surface 82b in a normal direction of the wire 9A. Further, all area of the outer contacting surface 81b may face all area of the inner contacting surface 82b in a normal direction of the wire 9A. In the same manner as the outer end engaged portion 91, the wire 9A does not function as a spring at a part of the inner end engaged portion 92 within which the outer supporting plate 81 and the inner supporting plate 82 are engaged in order to support the outer end engaged portion 91.

The position of the outer contacting surface 81b of the outer supporting plate 81 and the position of the inner contacting surface 82b of the inner supporting plate 82 are set, in a manner where the length of the inner end engaged portion 92 is determined to be shortest that at least required for supporting the spiral spring 9 so as to be in a predetermined design spiral shape.

The outer supporting plate 81 and the inner supporting plate 82 are positioned in a manner where the point at which the outer contacting surface 81b supports the inner end engaged portion 92 of the wire 9A and the point at which the inner contacting surface 82b contacts the inner end engaged portion 92 of the wire 9A are fit along the predetermined design spiral shape. As shown in FIG. 2, related to a positional relationship between the inner supporting plate 82 and the outer supporting plate 81 in a normal direction of the wire 9A, the inner supporting plate 82 and the outer supporting plate 81 are positioned in a manner where the inner contacting surface 82b, which is formed in a curved shape, is distanced at a distance. which is approximately identical to the thickness of the wire 9A, in a normal direction of the wire 9A, from the outer contacting surface 81b, which is formed in a curved shape. Thus, a plane at which the outer contacting surface 81b is located and a plate at which the inner contacting surface 82b is located are approximately parallel distanced at a distance, which is approximately identical to the thickness of the wire 9A.

The outer supporting plate 81 and the inner supporting plate 82 are positioned, in a radial direction of the spiral spring 9, in a manner where, in the front view illustrated in FIG. 2, the curved shape of the outer contacting surface 81b and the curved shape of the inner contacting surface 82b fit along the predetermined design spiral shape of the spiral spring 9. In other words, the outer contacting surface 81b and the inner contacting surface 82b are located in order to regulate the inner end engaging potion 92 from outside and inside, in a manner where the shape of the wire 9A becomes identical to the predetermined design spiral shape of the spiral spring 9.

The outer contacting surface 81b supports the inner end engaged portion 92 so as to contact each other at a contacting surface, and the inner contacting surface 82b supports the inner end engaged portion 92 so as to contact each other at a contacting surface. The outer contacting surface 81b supports the inner end engaged portion 92 so as to contact each other at least at plural points, and the inner contacting surface 82b supports the inner end engaged portion 92 so as to contact each other at least at plural points. Thus, the outer supporting plate 81 and the inner supporting plate 82 support the inner end engaged portion 92 of the wire 9A in a manner where the spiral spring 9 becomes in the predetermined design spiral shape.

In this embodiment, related to the inner end engaging member 8 engaging the inner end engaged portion 92 of the spiral spring 9, the outer supporting plate 81 corresponds to the first supporting body, the inner supporting plate 82 corresponds to he first supporting body. Further, the extending direction contacting surface 81a of the outer supporting plate 81 corresponds to the extending direction contacting portion, the outer contacting surface 81b corresponds to the first contacting portion. Furthermore, the inner contacting surface 82b of the inner supporting plate 82 corresponds to the second contacting portion of the present invention, the outer supporting plate 81 comprises the extending direction supporting member. "s" and the first supporting member "o" of the present invention, and the inner supporting plate 82 comprises the second supporting member "i" of the present invention.

Second Embodiment

Figure 4:
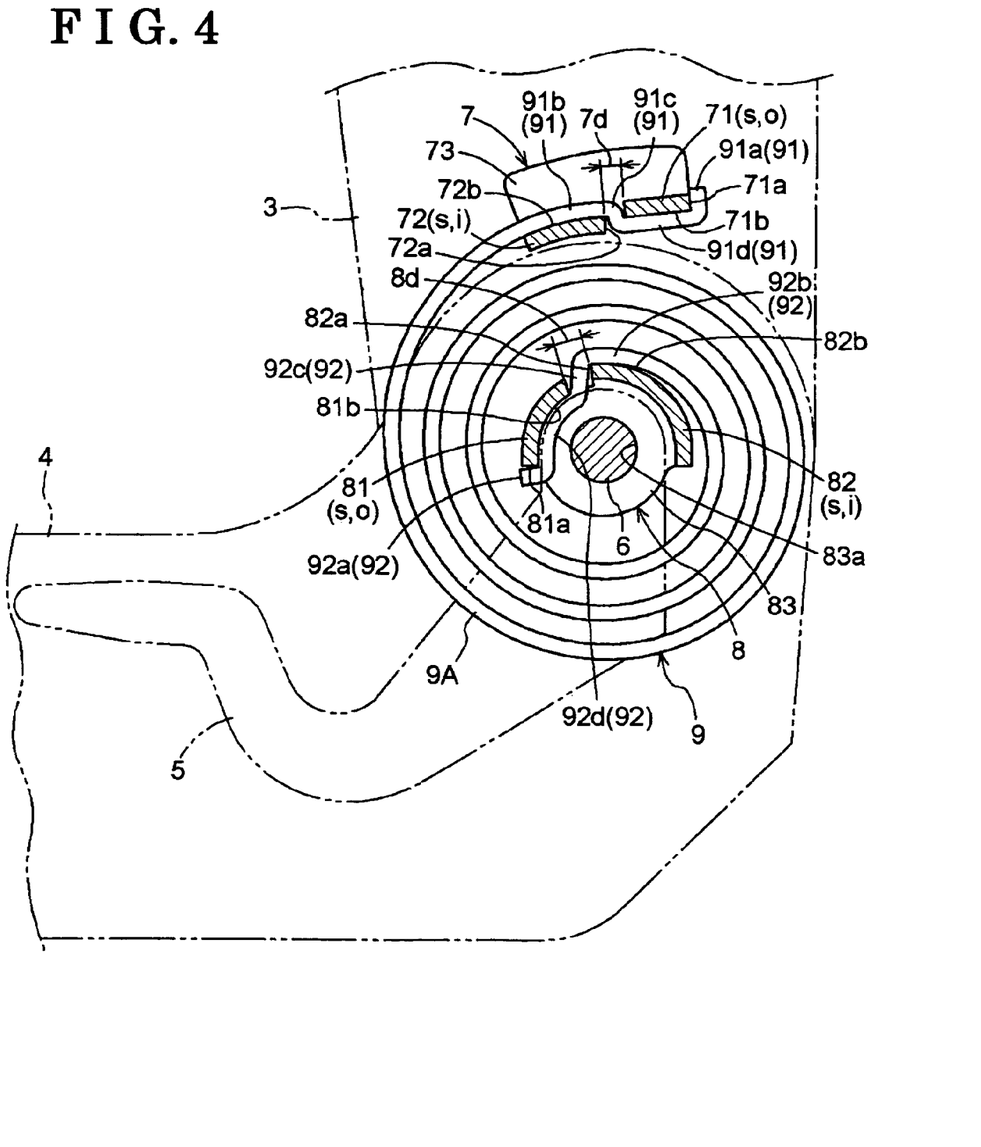
FIG. 4 illustrates a front view indicating a seat reclining device related to a second embodiment of the present invention.

A second embodiment related to the present invention will be explained in accordance with the attached drawings. FIG. 4 illustrates a front view of the seat reclining device 1 related to the second embodiment. As shown in FIG. 4, the seat reclining device 1 in the second embodiment has substantially the same configuration that of the first embodiment except the shape of the outer end engaged portion 91 and the inner end engaged portion 92 of the spiral spring 9, a configuration of the outer end engaging member 7 engaging the outer end engaged portion 91 and a configuration of the inner end engaging member 8 engaging the inner end engaged portion 92. In this section, the seat reclining device 1 of the second embodiment will be explained focusing on differences between the first embodiment and the second embodiment.

In the second embodiment, the spiral spring 9 includes a stepped portion formed at an approximately central portion of the outer end engaged portion 91 in an extending direction of the wire 9A. Specifically, the stepped portion 91c is formed in a stepped shape in a manner where a part of the wire 9A (outer end engaged portion 91) at the side of the inner end of in an extending direction thereof is located outward in a normal direction of the wire 9A.

The stepped portion 91c is formed by bending the wire 9A configuring the outer end engaged portion 91 so as to be in a crank shape as shown in the front section illustrated in FIG. 4. A part of the outer end engaged portion 91 located at the side of the inner end of the wire 9A in an extending direction of the wire 9A relative to the stepped portion 91c is indicated as a first main portion 91b, and a part of the outer end engaged portion 91 positioned at the side of the outer end of the wire 9A in an extending direction of the wire 9A relative to the stepped portion 91 is indicated as a second main portion 91d.

The first main portion 91b is formed in a carve shape in the front view illustrated in FIG. 4 so as to continue to another portion of the wire 9A at the side of the inner end in an extending direction thereof. The second main portion 91d is formed in a carved shape in the front view illustrated in FIG. 4 and located inside of the first main portion 91b in a normal direction of the wire 9A relative to the stepped portion 91c.

Further, in the same manner as the first embodiment, the outer end engaged portion 91 includes a bending portion 91a, which is formed by bending the outer end portion of the wire 9A outward in a normal direction.

In the second embodiment, the spiral spring 9 further includes a stepped portion formed at an approximately central portion of the inner end engaged portion 92 in an extending direction of the wire 9A Specifically, the stepped portion 92c is formed in a stepped shape in a manner where a part of the wire 9A (outer end engaged portion 91) at the side of the outer end of the wire 9A in an extending direction thereof is located outward in a normal direction of the wire 9A.

A part of the inner end engaged portion 92 located at the side of the outer end of the wire 9A in an extending direction of the wire 9A relative to the stepped portion 92c is indicated as a first main portion 92b, and a part of the inner end engaged portion positioned at 92 at the side of the inner end of the wire 9A in an extending direction of the wire 9A relative to the stepped portion 91 is indicated as a second main portion 92d.

The outer end engaging member 7 includes an outer supporting plate 71, an inner supporting plate 72 and a main portion 73 in the same manner as that of the first embodiment, however, a distance 7d is provided between the outer supporting plate 71 and the inner supporting plate 72 into which the stepped portion 91c of the outer end engaged portion 91 is inserted.

Specifically, an end surface of the outer supporting plate 71 formed at the side of the inner end of the wire 9A in an extending direction thereof (a left end surface of the outer supporting plate 71 in FIG. 2) distanced at a distance 7d from an end surface of the inner supporting plate 72 formed at the side of the outer end of the wire 9A in an extending direction thereof (a right end surface of the inner supporting plate 72 in FIG. 2).

Further the outer supporting plate 71 includes a first extending direction contacting surface 71a and an outer contacting surface 71b. Specifically, the first extending direction contacting surface 71a contacts the bending portion 91a of the outer end engaged portion 91 from the side of the inner end of the wire 9A in an extending direction thereof (from the opposite end side in an extending direction), and the outer contacting surface 71b contacts the second main portion 91d of the outer end engaged portion 91 from outside of the wire 9A in a normal direction thereof.

On the other hand, the inner supporting plate 72 includes a second extending direction contacting surface 72a and an inner contacting surface 72b. Specifically, the second extending direction contacting surface 72a contacts the stepped portion 91c of the outer end engaged portion 91 from the side of the inner end of the wire 9A in an extending direction thereof, and the inner contacting surface 72b contacts the first main portion 91b of the outer end engaged portion 91 from inside of the wire 9A in a normal direction thereof.

The outer end engaged portion 91 is supported by the outer contacting surface 71b and the inner contacting surface 72b from inside of the wire 9A in a normal direction thereof, and the outer end engaged portion 91 is also supported by the first extending direction contacting surface 71a and the second extending direction contacting surface 72a from the side of the inner end of the wire 9A in an extending direction thereof.

Further, inner supporting plate 72 supports the outer end engaged portion 91 at a position that is distanced, in the side of the inner end of the wire 9A in an extending direction thereof, at a predetermined distance, from a point at which the outer supporting plate 71 supports the outer end engaged portion 91.

As shown in FIG. 4, related to the positional relationship between the inner supporting plate 72 and the outer supporting plate 71 in an extending direction of the wire 9A, the end surface of the inner supporting plate 72 formed at the side of the outer end of the wire 9A in an extending direction thereof (the right end surface in FIG. 4) is distanced at a distance 7d from the end surface of the outer supporting plate 71 formed at the side of the inner end of the wire 9A in an extending direction thereof (the left end surface in FIG. 4).

Thus, the inner supporting plate 72 is located so as to support the outer end engaged portion 91 from inside of the wire 9A in a normal direction thereof at the point which is positioned so as to be distanced at least equal to or more than the distance 7d at the side of the inner end of the wire 9A in an extending direction thereof from the point at which the outer supporting plate 71 supports the outer end engaged portion 91.

The outer supporting plate 71 and the inner supporting plate 72 are provided in a manner where the point at which the outer contacting surface 71b supports the wire 9A that configures the outer end engaged portion 91 and the point at which the inner contacting surface 72b supports the wire 9A that configures the outer end engaged portion 91 are located along the predetermined design spiral shape of the spiral spring 9.

As shown in FIG. 4, the second main portion 91d, which is located at the side of the outer end of the wire 9A in an extending direction thereof, is located inward in a normal direction of the wire 9A at a height of the stepped portion 91c relative to the first main portion 91b and a part of the wire 9A, which continues from the first main portion 91b toward the side of the inner end of the wire 9A in an extending direction thereof.

Thus, the outer contacting surface 71b and the inner contacting surface 72b are positioned in consideration of the height of the stepped portion 91c between the first main portion 91b and the second main portion 91d.

In the second embodiment, related to the outer end engaging member 7 engaging the outer end engaged portion 91 of the spiral spring 9, the outer supporting plate 71 corresponds to the first supporting body of the present invention, the inner supporting plate 72 corresponds to the second supporting body of the present invention, the first extending direction contacting surface 71a of the outer supporting plate 71 corresponds to the extending direction contacting portion contacting the bending portion of the present invention, the outer contacting surface 71b corresponds to the first contacting portion of the present invention.

Further, the second extending direction contacting surface 72a of the inner supporting plate 72 corresponds to the extending direction contacting portion contacting the stepped portion, the inner contacting surface 72b corresponds to the second contacting portion of the present invention. Furthermore, in the second embodiment, the outer supporting plate 71 configures the extending direction supporting member "s" and the first supporting member "o" of the present invention, and the inner supporting plate 72 configures the extending direction supporting member "s" and the second supporting member "i" of the present invention.

The inner end engaging member 8 is comprised of, in the same manner as that of the fist embodiment, an outer supporting plate 81, an inner supporting plate 82 and a main portion 83. Further, a hole 83a is formed at a central portion of the main portion 83 into which the lever shaft 6 is inserted. In the same manner as the outer end engaging member 7, a distance 8d is formed between the outer supporting plate 81 and the inner supporting plate 82. The outer supporting plate 81 includes a first extending direction contacting surface 81a and an outer contacting surface 81b. The first extending direction contacting surface 81a contacts the bending portion 92a of the inner end engaged portion 92 from the side of the outer end of the wire 9A in an extending direction thereof (from the opposite end side in an extending direction). The outer contacting surface 81b contacts the second main portion 92d of the inner end engaged portion 92 from outside of the wire 9A in a normal direction thereof.

The inner supporting plate 82 includes a second extending direction contacting surface 82a and an inner contacting surface 82b. The second extending direction contacting surface 82a contacts the stepped portion 92c of the inner end engaged portion 92 from the side of the outer end of the wire 9A in an extending direction thereof. The inner contacting surface 82b contacts the first main portion 92b of the inner end engaged portion 92 from inside of the wire 9A in a normal direction thereof.

Thus, the inner end engaged portion 92 is supported by the outer contacting surface 81b from outside of the wire 9A in a normal direction thereof and by the inner contacting surface 82b from inside of the wire 9A in a normal direction thereof The inner end engaged portion 92 is also supported by the first extending direction contacting surface 81a and the second extending direction contacting surface 82a from the side of the outer end of the wire 9A in an extending direction thereof. Other substantial configuration is same as that of the outer end engaging member 7.

In the second embodiment, related to the inner end engaging member 8 engaging the inner end engaged portion 92 of the spiral spring 9, and the outer supporting plate 81 corresponds to the outer supporting body of the present invention, the inner supporting plate 82 corresponds to the second supporting body of the present invention. Further, the first extending direction contacting surface 81a of the outer supporting plate 81 corresponds to the extending direction contacting portion contacting the bending portion of the present invention, and outer contacting surface 81b corresponds to the first contacting portion of the present invention. Further, the second extending direction contacting surface 82a of the inner supporting plate 82 corresponds to the extending direction contacting portion contacting the stepped portion of the present invention, and the inner contacting surface 82b corresponds to the second contacting portion of the present invention. In the second embodiment, the outer supporting plate 81 comprises the extending direction supporting member "s" and the first supporting member "o", and the inner supporting plate 82 comprises the extending direction supporting member "s" and the second supporting member "i".

In the second embodiment, the outer end engaged portion 91 of the spiral spring includes the stepped portion 91c, and the inner end engaged portion 92 of the spiral spring includes the stepped portion 92c, however, they may not include bending portions.

Specifically, the outer end engaging member 7 supports the stepped portion 91c inserted into the distance 7d by means of the second extending direction contacting surface 72a from the opposite end side of the wire 9A in an extending direction thereof, and the inner end engaging member supports the stepped portion 92c inserted into the distance 8d by means of the extending direction contacting surface 82a from the opposite end side of the wire 9A in an extending direction thereof, and the second extending direction contacting surfaces 72a and 82a configure the extending direction supporting member "s" of the present invention. Thus, without supporting the bending portions 91a and 92a from the opposite end side of the wire 9A in an extending direction, the wire 9A forming the spiral spring 9 can be supported from the opposite end side in an extending direction thereof.

Third Embodiment

Figure 5:
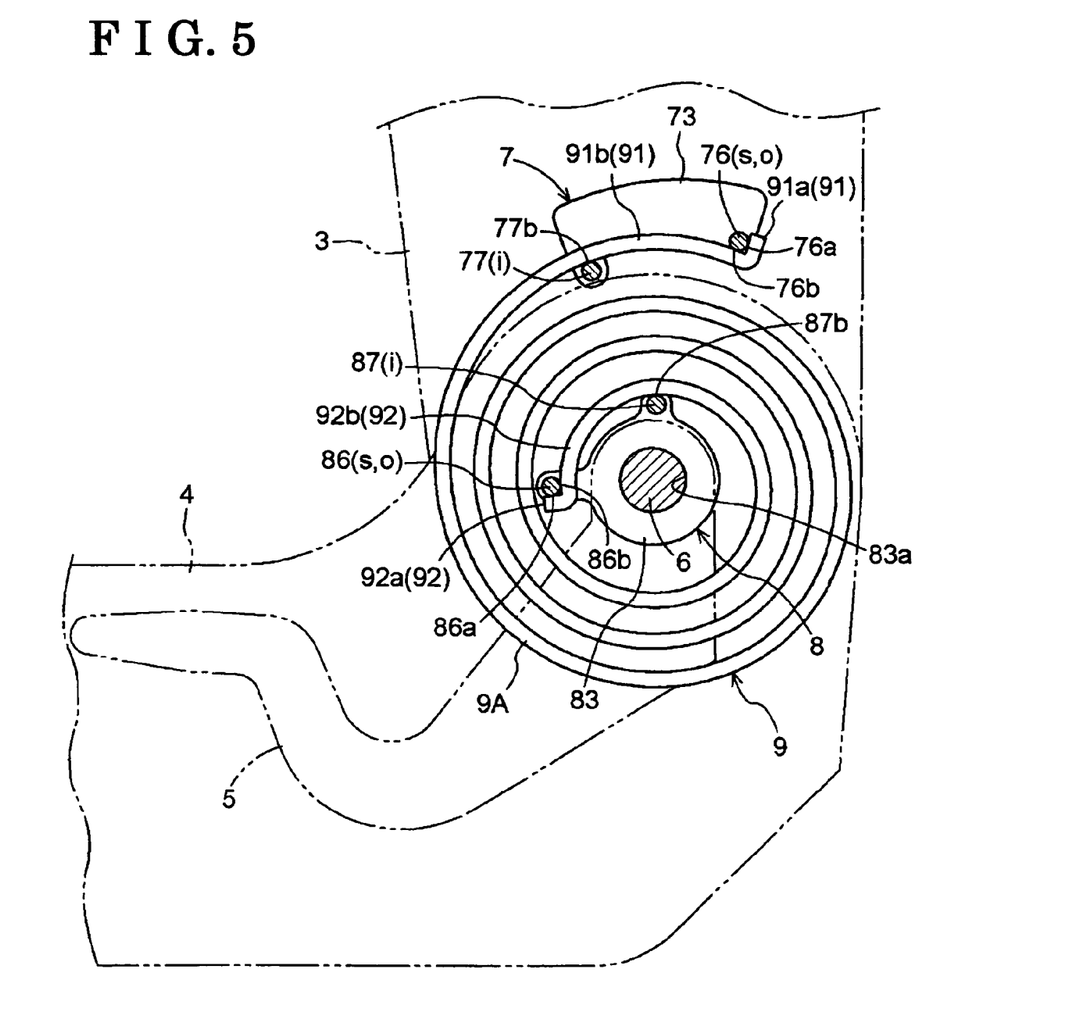
FIG. 5 illustrates a front view indicating a seat reclining device related to a third embodiment of the present invention.

A third embodiment related to the present invention will be explained in accordance with the attached drawings. FIG. 5 illustrates a front view of a seat reclining device 1 related to the third embodiment. As shown in FIG. 5, the seat reclining device 1 of the third embodiment has substantially the same configuration that of the first embodiment, however, the outer supporting plate 71, the outer supporting plate 81, the inner supporting plate 72 and the inner supporting plate 82 of the outer end engaging member 7 and the inner end engaging member 8 are not formed in a plate shape. In the third embodiment, outer supporting pins 76 and 86 and inner supporting pins 77 and 87, which are formed in a pin shape, are used instead of the plates. In this section, the seat reclining device 1 of the third embodiment will be explained focusing on differences between the first embodiment and the third embodiment.

The outer end engaging member 7 includes an outer supporting pin 76, an inner supporting pin 77 and a main portion 73. Specifically, the outer supporting pin 76 supports the outer end engaged portion 91 of the spiral spring 9 from outside of the wire 9A in a normal direction thereof, the inner supporting pin 77 supports the outer end engaged portion 91 from inside of the wire 9A in a normal direction thereof and the main portion 73 supports the outer supporting pin 76 and the inner supporting pin 77 so as to be integral.

Further, the outer supporting pin 76 includes an extending direction contacting portion 76a and a first contacting portion 76b. Specifically, the extending direction contacting portion 76a contacts the bending portion 91a of the outer end engaged portion 91 from the side of the inner end of the wire 9A in an extending direction thereof (from the opposite end side in an extending direction), and the first contacting portion 76b contacts the main portion 91b of the outer end engaged portion 91 from outside of the wire 9A in a normal direction thereof.

The inner supporting pin 77 includes an inner contacting portion 77b contacting the main portion 91b of the outer end engaged portion 91 from inside of the wire 9A in a normal direction thereof. Further, the inner supporting pin 77 is located at a position that is distanced at a predetermined distance toward the side of the inner end of the wire 9A in an extending direction thereof from a position at which the outer supporting pin 76 supports the outer end engaged portion 91

The outer supporting pin 76 and the inner supporting pin 77 are located in a manner where the point at which the outer engaging 76b supports the wire 9A, which configures the outer end engaged portion 91, and the point at which the inner contacting portion 77b supports the wire 9A, which has the outer end engaged portion 91, are located along the predetermined design spiral shape of the spiral spring 9. The distance between the outer supporting pin 76 and the inner supporting pin 77 in an extending direction of the wire 9A is set to be shortest length required for supporting the spiral spring 9 so as to be in the predetermined design spiral shape.

In the third embodiment, related to the outer end engaging member 7 engaging the outer end engaged portion 91 of the spiral spring 9, the outer supporting pin 76 corresponds to the first supporting body of the present invention, the inner supporting pin 77 corresponds to the second supporting body of the present invention. Further, the outer supporting pin 76 configures the extending direction supporting member "s" and the first supporting member "o" of the present invention, and the inner supporting pin 77 configures the second supporting member "i" of the present invention.

In a same manner as the outer end engaging member 7, the inner end engaging member 8 includes an outer supporting pin 86, an inner supporting pin 87 and a main portion 83. Specifically, the outer supporting pin 86 supports the inner end engaged portion 92 of the spiral spring 9 from outside of the wire 9A in a normal direction thereof, the inner supporting pin 87 supports the inner end engaged portion 92 from inside of the wire 9A in a normal direction thereof, and the main portion 83 supports the outer supporting pin 86 and the inner supporting pin 87 so as to be integral.

A hole 83a into which the lever shaft 6 is inserted is formed at an approximately central portion of the main portion 83. The outer supporting pin 86 includes an extending direction contacting portion 86a and an outer contacting portion 86b. Specifically, the extending direction contacting portion 86a contacts the bending portion 92a of the inner end engaged portion 92 from the side of the outer end of the wire 9A in an extending direction thereof (from the opposite end side in an extending direction), and the outer contacting portion 86b contacts the main portion 92b of the inner end engaged portion 92 from outside of the wire 9A in a normal direction thereof.

Further, the inner supporting pin 87 includes an inner contacting portion 87b contacting the main portion 92b of the inner end engaged portion 92 from inside of the wire 9A in a normal direction thereof. Other configurations of the inner end engaging member 8 is the same as that of the outer end engaging member 7.

In the third embodiment, related to the inner end engaging member 8 engaging the inner end engaged portion 92 of the spiral spring 9, the outer supporting pin 86 corresponds to the first supporting body of the present invention, the inner supporting pin 87 corresponds to the second supporting body of the present invention. Further, the outer supporting pin 86 configures the extending direction supporting member "s" and the first supporting member "o" of the present invention, and the inner supporting pin 87 configures the second supporting member "i" of the present invention.

Fourth Embodiment

Figure 6:
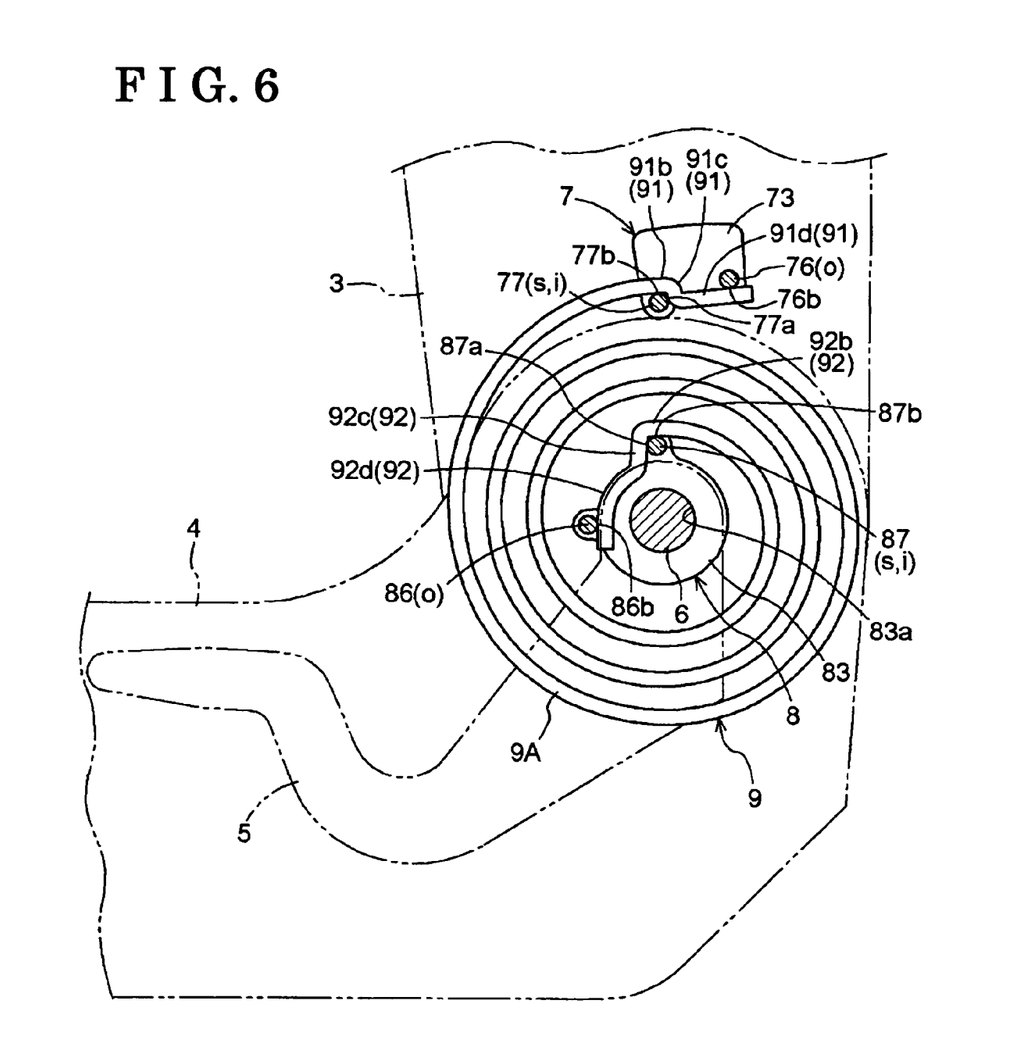
FIG. 6 illustrates a front view indicating a seat reclining device related to a fourth embodiment of the present invention.

A fourth embodiment related to the present embodiment will be explained in accordance with the attached drawings. FIG. 6 illustrates a front view of the seat reclining device 1 related to the fourth embodiment. As shown in FIG. 6, the seat reclining device 1 in the fourth embodiment substantially the same configuration as that of the second embodiment, however, the spiral spring 9 of the seat reclining device 1 in the fourth embodiment does not includes the bending portion 91a and the bending portion 92a. Further, the outer supporting plate 71, the outer supporting plate 81, the inner supporting plate 72 and the inner supporting plate 82 of the shapes of the outer end engaging member 7 and the inner end engaging member 8 are not formed in a plate shape, and these parts are formed in a pin shape, and outer supporting pins 76, 86 and inner supporting pins 77, 87 are used.

In the fourth embodiment, the spiral spring 9 includes a stepped portion 91c at an approximately central portion of the outer end engaged portion 91 in an extending direction thereof Specifically, the stepped portion 91c is formed in a stepped shape in a manner where a part of the wire 9A (outer end engaged portion 91) at the side of the inner end of the wire 9A in an extending direction thereof is located outside in a normal direction of the wire 9A.

A portion of the stepped portion 91c of the outer end engaged portion 91 at the side of the inner end of the wire 9A in an extending direction thereof is indicated as a first main portion 91b, and a portion of the stepped portion 91c of the outer end engaged portion 91 at the side of the outer end of the wire 9A in an extending direction thereof is indicated as a second main portion 91d.

The bending portion 91a formed at the wire 9A of the second embodiment is not formed that of the fourth embodiment. Further, the spiral spring 9 includes a stepped portion 92c formed at an approximately central portion of the inner end engaged portion 92 in an extending direction thereof. Specifically, the stepped portion 92c is formed in a stepped shape in a manner where a part of the wire 9A (inner end engaged portion 92) at the side of the outer end of the wire 9A in an extending direction thereof is located outside in a normal direction of the wire 9A.

A part of the stepped portion 92c of the inner end engaged portion 92 at the side of the outer end of the wire 9A in an extending direction thereof is indicated as a first main portion 92b, and a part of the stepped portion 92c of the inner end engaged portion 92 at the side of the inner end of the wire 9A in an extending direction thereof is indicated as the second main portion 92d. In the same manner as the outer end engaged portion 91, the bending portion 92a in the second embodiment is not formed in the fourth embodiment.

The outer end engaging member 7 includes an outer supporting pin 76, an inner supporting pin 77 and a main portion 73. Specifically, the outer supporting pin 76 supports the outer end engaged portion 91 of the spiral spring 9 from outside of the wire 9A in a normal direction thereof the inner supporting pin 77 supports the outer end engaged portion 91 from inside of the wire 9A in a normal direction thereof, and the main portion 73 supports the outer supporting pin 76 and the inner supporting pin 77 so as to be integral.

The outer supporting pin 76 includes an outer contacting portion 76b contacting the second main portion 91d of the outer end engaged portion 91 from outside of the wire 9A in a normal direction thereof. The inner supporting pin 77 includes an extending direction contacting portion 77a and an inner contacting portion 77b. Specifically, the extending direction contacting portion 77a contacts the stepped portion 91c of the outer end engaged portion 91 from the side of the inner end of the wire 9A in an extending direction thereof (from the opposite end side in an extending direction), and the inner contacting portion 77b contacts the first main portion 91b of the outer end engaged portion 91 from inside of the wire 9A in a normal direction thereof.

The inner supporting pin 77 is located so as to support the outer end engaged portion 91 at a position that is distanced at a predetermined distance toward the side of the inner end of the wire 9A in an extending direction thereof from a position at which the outer supporting pin 76 supports the outer end engaged portion 91.

The outer supporting pin 76 and the inner supporting pin 77 are located in a manner where the position at which the outer engaging 76b supports the wire 9A, which comprises the outer end engaged portion 91, and the position at which the inner contacting portion 77b supports the wire 9A, which comprises the outer end engaged portion 91, are located along the predetermined design spiral shape of the spiral spring 9. The distance between the outer supporting pin 76 and the inner supporting pin 77 in an extending direction of the wire 9A is set to be shortest length required for supporting the spiral spring 9 so as to be in the predetermined design spiral shape.

In the fourth embodiment, related to the outer supporting pin 76 engaging the outer end engaged portion 91 of the spiral spring 9, the outer supporting pin 76 corresponds to the first supporting body of the present invention, the inner supporting pin 77 corresponds to the second supporting body of the present invention. Further, the outer supporting pin 76 configures the first supporting member "o" of the present invention, and the inner supporting pin 77 configures the extending direction supporting member "s" and the second supporting member "i".

In the same manner as the outer end engaging member 7, the inner end engaging member 8 includes an outer supporting pin 86, an inner supporting pin 87 and a main portion 83. Specifically, the outer supporting pin 86 supports the inner end engaged portion 92 of the spiral spring 9 from outside of the wire 9A in a normal direction thereof, the inner supporting pin 87 supports the inner end engaged portion 92 from inside of the wire 9A in a normal direction thereof, and the main portion 83 supports the outer supporting pin 86 and the inner supporting pin 87 so as to be integral.

Further, a hole 83a into which the lever shaft 6 is inserted is formed at an approximately central portion of the main portion 83. The outer supporting pin 86 includes an outer contacting portion 86b contacting the second main portion 92d of the second main portion 92d from outside of the wire 9A in a normal direction thereof.

Furthermore, the inner supporting pin 87 includes an extending direction contacting portion 87a and an inner contacting portion 87b. Specifically, the extending direction contacting portion 87a contacts the stepped portion 92c of the inner end engaged portion 92 from the side of the outer end of the wire 9A in an extending direction thereof (from the opposite end side in an extending direction), and the inner contacting portion 87b contacts the first main portion 92b of the inner end engaged portion 92 from inside of the wire 9A in a normal direction thereof. Other substantial configurations of the inner end engaging member 8 is the same as that of the outer end engaging member 7.

In the fourth embodiment, related to the inner end engaging member 8 engaging the inner end engaged portion 92 of the spiral spring 9, the outer supporting pin 86 corresponds to the first supporting body of the present invention, and the inner supporting pin 87 corresponds to the second supporting body of the present invention. Further, the outer supporting pin 86 configures the first supporting member "o" of the present invention, and the inner supporting pin 87 configures the extending direction supporting member "s" and the second supporting member "i" of the present invention.

Fifth Embodiment

Figure 7:
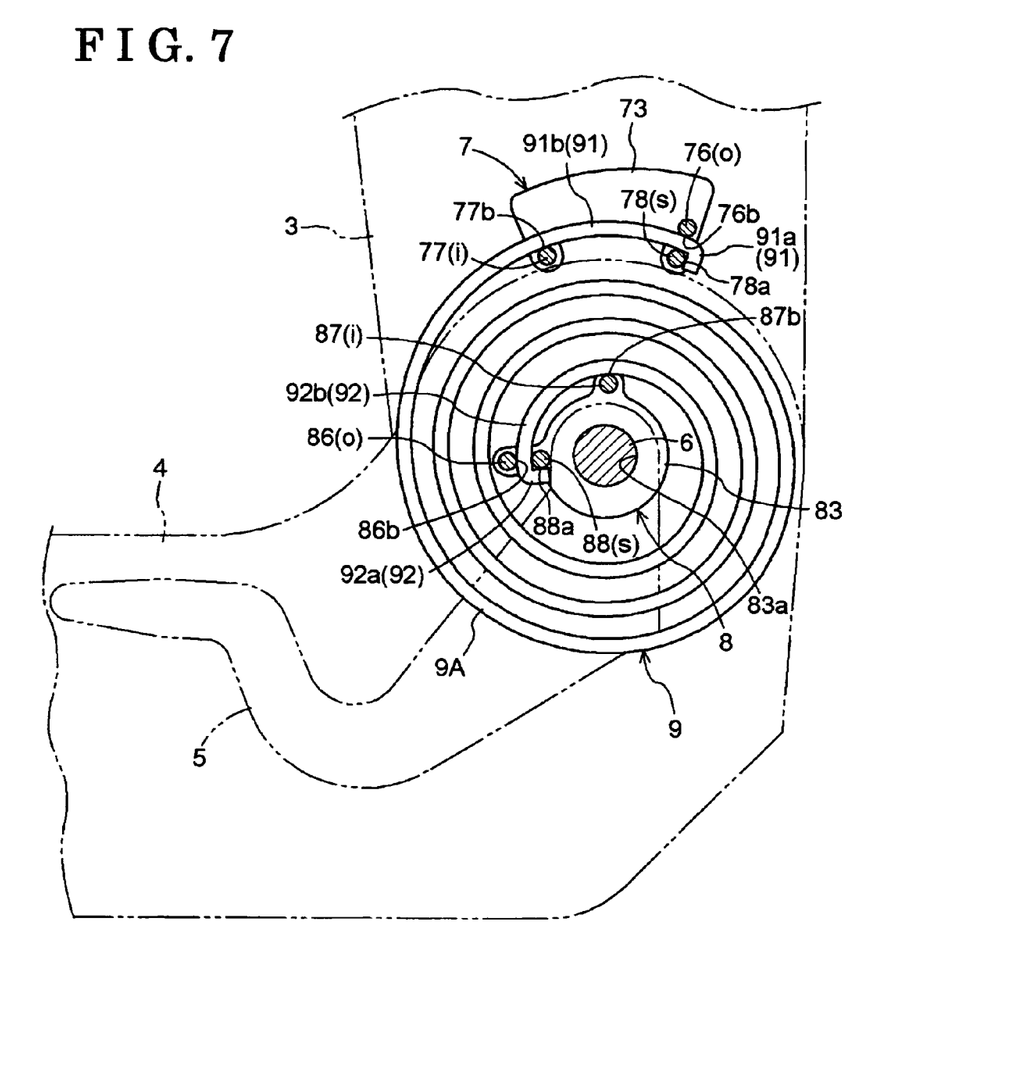
FIG. 7 illustrates a front view indicating a seat reclining device related to a fifth embodiment of the present invention.

A fifth embodiment of the present invention will be explained in accordance with the attached drawings. FIG. 7 illustrates a front view of the seat reclining device 1 related to the fifth embodiment. As shown in FIG. 7, the seat reclining device 1 in the fifth embodiment substantially the same configuration that of the third embodiment, however, the bending portions 91a and 92a of the spiral spring 9 are formed by bending each end portion of the wire 9A inward in a normal direction, the seat reclining device 1 includes, in addition to the outer supporting pins 76 and 86, and the inner supporting pins 77 and 87, a extending direction supporting pin 78 for supporting the bending portion 91a from the opposite end side of the wire 9A in an extending direction, and a extending direction supporting pin 88 for supporting the bending portion 92a from the opposite end side of the wire 9A in an extending direction. Other configurations are identical to that of the third embodiment.

Specifically, the outer end engaging member 7 includes an outer supporting pin 76, an inner supporting pin 77, an extending direction supporting pin 78 and a main portion 73. The outer supporting pin 76 supports the outer end engaged portion 91 of the spiral spring 9 from outside of the wire 9A in a normal direction thereof, the inner supporting pin 77 supports the outer end engaged portion 91 from inside of the wire 9A in a normal direction thereof, an extending direction supporting pin 78 supports the outer end engaged portion 91 from inside of the wire 9A in an extending direction thereof (from the opposite end side in an extending direction), and the main portion supports the outer supporting pin 76, the inner supporting pin 77 and the extending direction supporting pin 78 so as to be integral.

The outer supporting pin 76 includes an outer contacting portion 76b contacting the main portion 91b of the outer end engaged portion 91 from outside of the wire 9A in a normal direction thereof. The inner supporting pin 77 includes an inner contacting portion 77b contacting the main portion 91b of the outer end engaged portion 91 from inside of the wire 9A in a normal direction thereof The extending direction supporting pin 78 includes an extending direction contacting portion 78a contacting the bending portion 91a of the outer end engaged portion 91 from the side of the inner end of the wire 9A in an extending direction thereof.

In the fifth embodiment, the extending direction supporting pin 78 is located so as to face the outer supporting pin 76 relative to the outer end engaged portion 91.

In the fifth embodiment, related to the outer end engaging member 7 engaging the outer end engaged portion 91 of the spiral spring 9, the outer supporting pin 76 configures the first supporting member "o" of the present invention, the inner supporting pin 77 configures the second supporting member "i" of the present invention, and the extending direction supporting pin 78 configures the extending direction supporting member "s" of the present invention.

The inner end engaging member 8 includes an outer supporting pin 86, an inner supporting pin 87, an extending direction supporting pin 88 and a main portion 83. Specifically, the outer supporting pin 86 supports the inner end engaged portion 92 of the spiral spring 9 from outside of the wire 9A in a normal direction thereof, the inner supporting pin 87 supports the inner end engaged portion 92 from inside of the wire 9A in a normal direction thereof, the extending direction supporting pin 88 supports the inner end engaged portion 92 from the side of the outer end of the wire 9A in an extending direction thereof (from the opposite end side in an extending direction), and the main portion 83 supports the outer supporting pin 86, the inner supporting pin 87 and the extending direction supporting pin 88 so as to be integral.

A hole 83a into which the lever shaft 6 is inserted is formed at a approximately central portion of the main portion 83. The outer supporting pin 86 includes an outer contacting portion 86b contacting the main portion 92b of the inner end engaged portion 92 from outside of the wire 9A in a normal direction thereof.

The inner supporting pin 87 includes an inner contacting portion 87b contacting the main portion 92b of the inner end engaged portion 92 from outside of the wire 9A in an extending direction thereof. The extending direction supporting pin 88 includes an extending direction contacting portion 88a contacting the bending portion 92a of the inner end engaged portion 92 from the side of the outer end of the wire 9A in an extending direction thereof.

In the fifth embodiment, the extending direction supporting pin 88 is located so as to face the outer supporting pin 86 relative to the inner end engaged portion 92. Other configurations of the inner end engaging member 8 is substantially identical with the outer end engaging member 7.

In the fifth embodiment, related to the inner end engaging member 8 engaging the inner end engaged portion 92 of the spiral spring 9, the outer supporting pin 86 configures the first supporting member "o" of the present invention, the inner supporting pin 87 configures the second supporting member "i" of the present invention, and the extending direction supporting pin 88 configures the extending direction supporting member "s" of the present invention.

According to the above embodiments, the outer end engaged portion 91 is engaged at the seat back frame 3 by means of the outer end engaging member 7, and the inner end engaged portion 92 is engaged at the seat cushion frame 4 by means of the inner end engaging member 8. However, the outer end engaged portion 91 may be engaged at the seat cushion frame 4, and the inner end engaged portion 92 may be engaged at the seat back frame 3.

According to the above embodiments, the spiral spring 9 is formed by winding the wire 9A having a constant rectangular cross section so as to be in a predetermined spiral shape. However, the configuration of the spiral spring 9 is not limited to such structure. For example, the spiral spring 9 may be formed by winding a wire having a constant circular cross section. Another known configurations may be applied to the spiral spring 9.

According to the above embodiments, the configuration of the above embodiment may be applied to one of the outer end engaging member 7 and the inner end engaging member 8, and another configuration may be applied to the other of them.

According to the above embodiments, the seat reclining device 1 is applied to the vehicle seat, however, it can be applied to various types of seats.

Thus, the first engaged portion or the second engaged portion, or each of the first engaged portion and the second end portion, is regulated so as not to rotated in a rotational direction relative to the outer end engaging member or the inner end engaging member, and the shape of the wire in an extending direction thereof is regulated so as to be in a predetermined shape determined on the basis of the supporting position of the first supporting member of the outer end engaging member and the position of the supporting the second supporting member of the inner end engaging member.

Thus, the spiral spring is supported in a manner where the shape of the wire is kept in a predetermined spiral shape. Further, chances that the wire is unevenly provided can be reduced, and an internal stress applied to each roll of the wire can be equalized The first engaged portion or the second engaged portion, or each of the first engaged portion and the second end portion includes the bending portion formed by simply bending each end portion outward in a normal direction of the wire. Further, by means of the first supporting body, the outer end engaging member or the inner end engaging member, or each of the outer end engaging member and the inner end engaging member, serves both as the extending direction supporting member and the first supporting member. Thus, configurations of the engaged portions and the contacting portions can be simplified.

The first engaged portion or the second engaged portion, or each of the first engaged portion and the second end portion simply includes the stepped portion formed in a manner where the part of the wire at the opposite end side in an extending direction thereof is located outside of the spiral spring in a normal direction thereof.

Further, by means of the second supporting body, the outer end engaging member or the inner end engaging member, or each of the outer end engaging member and the inner end engaging member, serves both as the extending direction supporting member and the second supporting member. Thus, configurations of the engaged portions and the contacting portions can be simplified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat reclining device comprising:
    a spiral spring made of a wire and formed in a spiral shape including:
        a first engaged portion formed at one end of the spiral spring; and
        a second engaged portion formed at the other end of the spiral spring, wherein one of the first engaged portion and the second engaged portion engaging a seat cushion frame, and the other of the first engaged portion and the second engaged portion engaging a seat back frame, which is rotatably provided at the seat cushion frame;
    a first engaging member engaging the first engaged portion of the spiral spring; and
    a second engaging member engaging the second engaged portion of the spiral spring, wherein one of the first engaging member and the second engaging member, or each of the first engaging member and the second engaging member including:
        an extending direction supporting member supporting the first engaged portion and/or the second engaged portion, from a direction opposite an extending direction of the spiral spring;
        a first supporting member supporting at least one of the first engaged portion and the second engaged portion from outside in a normal direction of the spiral spring; and
        a second supporting member supporting the at least one of the first engaged portion and the second engaged portion from inside in a normal direction of the spiral spring, the second supporting member provided so as to be distanced at a predetermined distance from the first supporting member toward the opposite end side in an extending direction of the spiral spring.

2. The seat reclining device according to claim 1, wherein the first supporting member and the second supporting member are provided so as to support the spiral spring in a manner where a distance between each roll of the wire of the spiral spring is approximately constant.

3. The seat reclining device according to claim 1, wherein, one of the first engaged portion and the second engaged portion, or each of the first engaged portion and the second engaged portion, includes a bending portion formed by bending one end and/or the other end of the wire outward in a normal direction of the wire, the extending direction supporting member and the first supporting member are comprised of a first supporting body including an extending direction contacting portion contacting the bending portion from opposite the extending direction of the spiral spring, and a first contacting portion contacting the first engaged portion and/or the second-engaged portion from outside in a normal direction of the spiral spring and the second supporting member is comprised of a second supporting body including a second contacting portion contacting the first engaged portion and/or the second engaged portion from inside in a normal direction of the spiral spring.

4. The seat reclining device according to claim 1, wherein, one of the first engaged portion and the second engaged portion, or each of the first engaged portion and the second engaged portion, includes a stepped portion formed in a manner where a part of the wire is located outside relative to the spiral spring in a normal direction of thereof, the extending direction supporting member and the second supporting member are comprised of a second supporting body including an extending direction contacting portion contacting the stepped portion from the opposite end side in an extending direction of the spiral spring and a second contacting portion contacting the first engaged portion and/or the second engaged portion from inside in a normal direction of the spiral spring, and the first supporting member is comprised of a first supporting body including a first contacting portion contacting the first engaged portion and/or the second engaged portion from outside in a normal direction of the spiral spring.

5. The seat reclining device according to claim 2, wherein, one of the first engaged portion and the second engaged portion, or each of the first engaged portion and the second engaged portion, includes a bending portion formed by bending one end and/or the other end of the wire outward in a normal direction of the wire, the extending direction supporting member and the first supporting member are comprised of a first supporting body including an extending direction contacting portion contacting the bending portion from opposite the extending direction of the spiral spring, and a first contacting portion contacting the first engaged portion and/or the second engaged portion from outside in a normal direction of the spiral spring, and the second supporting member is comprised of a second supporting body including a second contacting portion contacting the first engaged portion and/or the second engaged portion from inside in a normal direction of the spiral spring.

6. The seat reclining device according to claim 2, wherein, one of the first engaged portion and the second engaged portion, or each of the first engaged portion and the second engaged portion, includes a stepped portion formed in a manner where a part of the wire is located outside relative to the spiral spring in a normal direction of thereof, the extending direction supporting member and the second supporting member are comprised of a second supporting body including an extending direction contacting portion contacting the stepped portion from the opposite end side in an extending direction of the spiral spring, and a second contacting portion contacting the first engaged portion and/or the second engaged portion from inside in a normal direction of the spiral spring and the first supporting member is comprised of a first supporting body including a first contacting portion contacting the first engaged portion and/or the second engaged portion from outside in a normal direction of the spiral spring.

7. A seat reclining device comprising:
a spiral spring made of a wire and formed in a spiral shape including:
a first engaged portion formed at one end of the spiral spring; and
a second engaged portion formed at the other end of the spiral spring,
a first engaging member engaging the first engaged portion of the spiral spring; and
a second engaging member engaging the second engaged portion of the spiral spring, wherein one of the first engaging member and the second engaging member, or each of the first engaging member and the second engaging member includes:
an extending direction supporting member supporting the first engaged portion and/or the second engaged portion, from opposite an extending direction of the spiral spring;
a first supporting member supporting at least one of the first engaged portion and the second engaged portion from outside in a normal direction of the spiral spring; and
a second supporting member supporting the at least one of the first engaged portion and the second engaged portion from inside in a normal direction of the spiral spring, the second supporting member positioned at a predetermined distance from the first supporting member toward the opposite end side in an extending direction of the spiral spring.

* * * * *